Patented Dec. 30, 1941

2,267,737

UNITED STATES PATENT OFFICE 2,267,737

TREATMENT OF HYDROCARBONS

Vladimir N. Ipatieff and Vladimir Haensel, Chicago, Ill., assignors to Universal Oil Products Company, Chicago, Ill., a corporation of Delaware No Drawing. Application October 12, 1940,
Serial No. 360,946

7 Claims. (Cl. 196—10)

This invention relates particularly to the treatment of normally gaseous hydrocarbons and is more specifically directed to the use of novel catalysts for polymerization of normally gaseous olefins to produce liquid polymers therefrom utilizable as high antiknock constituents of gasoline. While the process is aimed primarily at the polymerization of normally gaseous hydrocarbons, it also embodies the treatment of normally liquid hydrocarbons in its scope.

The utilization of the gaseous olefins produced incidental to cracking heavy portions of petroleum both thermally and catalytically for the production of motor fuel fractions has become one of increasing importance as a means of augmenting the motor fuel yields. The process as generally employed to polymerize these olefins which are present along with other paraffinic gases and hydrogen in the gases vented from the receivers of cracking plants and distilled overhead in the stabilization of primary cracked distillates embody both strictly thermal methods and combination thermal-catalytic processes. The thermal processes depend for their operation upon the use of relatively high temperatures and pressures so that the olefins present in gas mixtures are not selectively polymerized since a certain amount of decomposition occurs along with other reactions involving alkylation of i-paraffins with olefins. The catalytic processes are generally more selective and here it is to be noted that a number of materials have been proposed for utilization commercially varying in activity from the mildly active fuller's earth and clays through the activity exhibited by the metal halides such as aluminum chloride and various mineral acids, particularly sulfuric acid and phosphoric acid. The present process is a contribution to the art of catalytic polymerization in that it employs a new type of catalyst which is utilized in solid granular form.

In one specific embodiment the present invention comprises the treatment of normally gaseous olefins for the polymerization thereof in the presence of catalysts consisting of complexes between sulfuric acid and dioxane. These complexes are preferably employed on relatively inert granular supports.

For the purpose of understanding the chemical nature of the active component of the catalyst proposed for use in accordance with the present invention, the following equation is given to show the formation and the structure of the simplest complex which may be used:

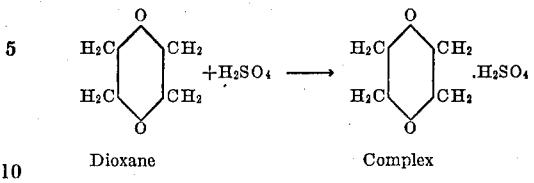

Dioxane    Complex

Catalyst composites comprising the above type of materials as their active components are made by thoroughly mixing the ingredients consisting of 1.4-dioxane (boiling point 101° C.), sulfuric acid of 96% concentration and some type of granular supporting material such as kieselguhr, fuller's earth, clays, etc. to solidification. The quantities of sulfuric acid and dioxane used in respect to the inert support are preferably such that a solid crystalline or nearly crystalline solid is formed which is diluted by the addition of the inert filler. The complex shown in the above formulas is a stable compound which melts at about 101° C.; the bond between the acid and the dioxane is sufficiently stable to make the compound only slowly reactive with water.

The solidified material resulting from the mixing of the dioxane, acid, and carrier may be broken up into particles of varying mesh size for use in polymerization. In operating with this granular material, the simplest procedure is to add the granules to a reaction tube or chamber and pass olefin-containing gas mixtures therethrough, preferably in a downward direction. The temperatures employed with the more readily polymerizable normally gaseous olefins such as iso-butene are of a low order within the approximate range of 32 to 175° F. In polymerizing normal butenes, propylene, or ethylene, increasing temperatures are preferably employed with the increasing difficulty of polymerization with these compounds. Super-atmospheric pressure may favor the reactions on account of the reduction in volume attendant upon polymerization and if desired pressures up to 1,000 lbs./sq. in. may be employed. Following the polymerization treatment, the products may be fractionated to separate gasoline boiling range material while any unconverted material may be recycled for further contact with the same bed of catalyst or subjected to treatment with further fresh portions of the catalyst to polymerize any residual olefins which have escaped conversion in the first contact with the catalytic material.

In addition to methods described above for the preparation of the catalyst, it can be prepared by first forming a complex in the absence of granular supporting material, heating it to its melting point and adding the inert granular substance. This method of operation is particularly suited to the manufacture of catalysts including finely divided siliceous materials such as kieselguhr or clays such as those of the raw or acid treated bentonite or montmorillonite variety. If desired, the inert filling or supporting material may be omitted entirely and as a further alternative, the complexes may be formed using mixtures of sulfuric acid and phosphoric acid since both form similar types of complexes having value as catalysts for the polymerization of olefins. However, the use of phosphoric acid renders the complexes somewhat less active so that these particular composites may be utilized in obtaining selective polymerization of iso-butene, for example, when in admixture with more difficultly polymerizable normal butenes, propene, or ethylene.

The following example data are given to indicate the type of results which are normally obtainable in the operation of the present process although not with the intention of limiting the scope of the invention in exact correspondence therewith.

The sulfuric acid-p-dioxane complex was prepared by first adding a definite quantity of dioxane to the carrier, either almina or kieselguhr, followed by the slow addition of a definite quantity of 100% sulfuric acid. The absence of reaction between the complex and alumina was proved by hydrolyzing a small portion of the catalyst from which alumina was obtained. Some heat is evolved during the formation of the complex and upon cooling the entire mass solidifies. This was broken up into particles of suitable size which were then put into the reaction tube. Thus, two catalysts were prepared for preliminary experiments, the following tabulation showing their composition:

TABLE 1

| | Composition | Per cent by weight |
|---|---|---|
| Catalyst No. 1 | $Al_2O_3$ | 23.2 |
| | $H_2SO_4$ | 40.6 |
| | Dioxane | 36.2 |
| Catalyst No. 2 | $Al_2O_3$ | 47.6 |
| | $H_2SO_4$ | 27.9 |
| | Dioxane | 24.5 |

The results obtained in the treatment of various mixtures of isobutane and i-butene in which the i-butane was in molal excess are shown in Table 2. These indicated that the yields are equivalent to the amount of olefin reacting indicating polymerization to the substantial exclusion of alkylation. The analysis of the product shows that olefins are the predominant hydrocarbons present.

TABLE 2

*Polymerization of iso-butene*

| Catalyst No. | 1 | | 2 | |
|---|---|---|---|---|
| Length of run, mins. | Part I 120 | Part II 120 | Part I 120 | Part II 120 |
| Pressure, lbs./sq. in. | 500 | 500 | 120 | 110 |
| Temperature, °C | 30 | 25 | 30 | 30 |
| Mol. per cent i-$C_4H_8$ in chg. | 10.6 | 10.6 | 25.2 | 25.2 |
| Charge in grams | 168 | 230 | 84.0 | 61.5 |
| Grams i-$C_4H_8$ chgd. | 17.8 | 24.4 | 21.2 | 15.2 |
| Grams liquid formed | 15.3 | 20.5 | 15.5 | 12.0 |
| Grams exit gas | 158 | 204 | 66.7 | 47.4 |
| Grams i-$C_4H_8$ in exit gas | 3.6 | 3.3 | 3.7 | 2.7 |
| Grams i-$C_4H_8$ converted | 14.2 | 21.1 | 17.5 | 12.5 |
| Conversion to liquid per cent of olefin react. | 108 | 97.5 | 88.5 | 96.0 |
| Liquid space velocity | 0.9 | 1.3 | 1.7 | 1.25 |

We claim as our invention:

1. A process for the polymerization of olefins which comprises subjecting said olefins to contact with a catalyst comprising essentially a complex formed by the interaction of dioxane and sulfuric acid.

2. A process for the polymerization of olefins which comprises subjecting said olefins to contact with a catalyst comprising essentially a complex formed by the interaction of dioxane and sulfuric acid, said complex being supported upon a relatively inert carrying material.

3. A process for the polymerization of olefins which comprises subjecting said olefins to contact with a catalyst comprising essentially a complex formed by the interaction of dioxane and sulfuric acid, said complex being supported upon siliceous carrying material.

4. A process for the polymerization of olefins which comprises subjecting said olefins to contact at a temperature of from about 32 to about 175° F. with a catalyst comprising essentially a complex formed by the interaction of dioxane and sulfuric acid, said complex being supported upon a relatively inert carrying material.

5. A process for the polymerization of olefins in an olefin-containing gas mixture which comprises subjecting said gas mixture to contact at a temperature of from about 32 to about 175° F. with a catalyst comprising essentially a complex formed by the interaction of dioxane and sulfuric acid, said complex being supported upon a relatively inert carrying material.

6. A process for the polymerization of olefins in an olefin-containing gas mixture which comprises subjecting said gas mixture to contact at a temperature of from about 32 to about 175° F. under a pressure of from approximately atmospheric to about 1,000 pounds per square inch with a catalyst comprising essentially a complex formed by the interaction of dioxane and sulfuric acid, said complex being supported upon a relatively inert carrying material.

7. A process for the polymerization of normally gaseous olefin hydrocarbons which comprises subjecting said material to polymerization treatment in the presence of a complex formed by the interaction of dioxane and sulfuric acid.

VLADIMIR N. IPATIEFF.
VLADIMIR HAENSEL.